Patented Mar. 8, 1938

2,110,483

UNITED STATES PATENT OFFICE 2,110,483

PROCESS FOR THE MANUFACTURE OF HIGH MOLECULAR ALIPHATIC ALCOHOLS

August Guyer, Zurich, Switzerland, assignor to firm Chemical Works formerly Sandoz, Basel, Switzerland No Drawing. Application June 26, 1935, Serial No. 28,557. In Switzerland July 7, 1934

6 Claims. (Cl. 260—156)

The present invention relates to an improved process for the manufacture of higher molecular alcohols from aliphatic carboxylic acids and their derivatives by the so-called hydrogenation process.

It is since long known that the manufacture of aliphatic alcohols of high molecular weight from aliphatic carboxylic acids can be carried out by treating the said aliphatic carboxylic acids or their derivatives with hydrogen under pressure in presence of catalysts and at a high temperature.

In this treatment the carboxylic acids or their derivatives become transformed into respective alcohols which are very valuable products. This transformation of acids into alcohols is not always quantitative and the yield of alcohol depends on the activity of the catalyst used for the reduction and also on the pressure, the temperature and the duration of the treatment. Especially the activity of the catalyst used in the hydrogenation process is of great importance, as it allows to increase the speed of the reaction and to obtain higher yields of the desired compounds.

My present invention is characterized by the improvement of the activity of the catalysts used until now for the purpose of hydrogenation of aliphatic carboxylic acids and their derivatives and represents, therefore, an important technical improvement of the hydrogenation process.

In order to increase the activity of the usual hydrogenation catalysts, I add thereto a small quantity of iron or of its salts and in this manner I obtain very active catalysts, which permit to obtain a nearly quantitative hydrogenation of the starting products in a much shorter time and even, as it has been observed in several cases, at a lower temperature and at a lower pressure.

One object of my invention is, therefore, a method for improving the activity of hydrogenation catalysts by adding thereto small quantities of iron, this addition being of 0.1 to 10% on the weight of the usual catalyst.

Another object of my invention is the very active catalysts suitable for the hydrogenation of aliphatic carboxylic acids and their derivatives which are characterized by a content of iron, which may vary from 0.1 to 10% of the weight of the catalyst.

Still another object of my invention is the use of the above cited catalysts containing 0.1 to 10% of iron, for the hydrogenation of aliphatic carboxylic acids or their derivatives for the purpose of the manufacture of aliphatic alcohols with a better yield and sometimes under smoother conditions.

As catalysts which can be improved according to the present invention, there may be cited the usual catalysts consisting of the heavy metals or their mixtures or their oxides. As especially suitable metals I may cite copper, chromium, nickel, uranium, cobalt, zinc, cadmium, molybdenum, tungsten, vanadium. Generally, I prefer to use these metals in form of their oxides or their difficultly reducible salts and also in form of mixtures of several metals preferably precipitated on a carrier. As particularly suitable catalyst, the activity of which can be improved by my method, I have found to be the copper chromite catalyst that can be prepared by the method indicated by Adkins and Connor Jour. Am. Chem. Soc. 53, 1092 (1931). But also mixtures of oxides of chromium, cadmium, zinc and copper can be improved in their activity by my process.

As material suitable for the production of aliphatic alcohols of high molecular weight, I can use the free saturated and unsaturated aliphatic carboxylic acids with more than four carbon atoms, such as lauric, myristic, palmitic, stearic, oleic, undecylenic, ricinoleic, naphthenic, abietic, adipic, sebacic and similar acids and their esters with mono- or polyhydroxy-compounds, such as esters of monovalent alcohols of the aliphatic series like methyl-, ethyl-, propyl-, isopropyl-, butyl-, isobutyl-, amyl-, cetyl-alcohols; or of polyvalent aliphatic alcohols such as of glycol and glycerol, which last can be found in the nature as mono-, di- and tri-glycerides of the above cited acids.

The compounds which can be used in my process correspond, therefore, to the general formula

wherein R represents an aliphatic or cycloaliphatic chain with at least 4 C-atoms and R₁ represents hydrogen or an aliphatic, cycloaliphatic or aromatic radical. All these compounds are characterized by that they contain at least a radical of an aliphatic or cycloaliphatic carboxylic acid, which will be transformed by hydrogenation of the carbonyl group into the respective alcohol.

It is further also one object of my invention to subject to the hydrogenation process using as catalysts, those, that possess an improved activity, such as esters of aliphatic carboxylic acids that are esterified with cycloaliphatic alcohols or with aromatic hydroxy compounds.

The hydrogenation process can be carried out at temperatures of 150° to 400° C., but preferably temperatures of 250° to 350° C. will be used. The pressure which is generally necessary to obtain good results may vary between 50 and 400 at., but preferably pressures of 150–300 at. will be used.

The raw hydrogenation products obtained according to my invention consist nearly of the respective alcohols and are very pure in this respect as they generally contain only traces of the starting products or of hydrocarbons. The alcohols produced according to my process can be separated from the catalysts by any usual method used for this purpose and are ready for the use to which they are designed.

My invention being of general application to the bodies cited above and being of principal nature, the following examples, without being limitative, show how it can be practically carried out, the parts being by weight.

*Example 1*

1000 parts of the cetyl-ester of palmitic acid are mixed with 50 parts of a copper-chromium catalyst, containing 3% of iron as activator, and the mixture thus obtained is treated under good stirring with hydrogen in a closed vessel at about 300° C. and under a pressure of 200 at. The reduction takes place very rapidly, whereby the reaction product obtained is cetyl alcohol containing about 1–2% of the unchanged ester.

Naturally occurring oils containing the cetyl-ester of palmitic acid, such as spermaceti oil may also be used in this process to obtain cetyl alcohol.

By using a copper-chromium catalyst without addition of iron, it needs about a half time more to obtain a product which still contains 3–4% of the unchanged starting material.

*Example 2*

1000 parts of cocoanut fat are mixed with about 50 parts of a copper-chromium catalyst containing about 5% of iron oxide as activator, and treated with hydrogen in a closed vessel and under good stirring at 285° C. and under a pressure of 250 at. After a short time the reduction is nearly complete and as resulting product nearly pure laurylalcohol is obtained.

What I claim is:—

1. A process for the production of aliphatic and cycloaliphatic alcohols, which comprises heating organic compounds of the general formula

wherein R represents an aliphatic or a cycloaliphatic chain with at least 4 carbon atoms and $R_1$ represents hydrogen or an aliphatic, cycloaliphatic or an aromatic radical, with hydrogen within a temperature range from 250 to 300° C. and within a pressure range from 150 to 300 atmospheres in the presence of a catalyst consisting of copper oxide and chromium oxide and containing 0.1 to 10 per cent of iron.

2. A process for the production of aliphatic and cycloaliphatic alcohols, which comprises heating organic compounds of the general formula

wherein R represents an aliphatic or a cycloaliphatic chain with at least 4 carbon atoms and $R_1$ represents hydrogen or an aliphatic, cycloaliphatic or an aromatic radical, with hydrogen within a temperature range from 250 to 300° C. and within a pressure range from 150 to 300 atmospheres in the presence of a catalyst consisting of copper oxide and chromium oxide and containing 1 per cent of iron.

3. A process for the manufacture of aliphatic alcohols, which comprises heating esters of aliphatic carboxylic acids containing at least 8 carbon atoms in the acid radical with hydrogen within a temperature range from 250 to 300° C. and within a pressure range from 150 to 300 atmospheres in the presence of a catalyst consisting of copper oxide and chromium oxide and containing 1 per cent of iron.

4. The process of claim 3, in which the ester of the aliphatic carboxylic acid is the cetyl-ester of palmitic acid.

5. The process of claim 3, in which the ester of the aliphatic carboxylic acid is cocoanut fat.

6. The process of claim 3, in which the ester of the aliphatic carboxylic acid is spermaceti oil.

AUGUST GUYER.